US008864584B2

(12) United States Patent
Radek et al.

(10) Patent No.: US 8,864,584 B2
(45) **Date of Patent: *Oct. 21, 2014**

(54) WAGERING GAME MACHINE WITH AREA SOUND PANNING

(75) Inventors: Paul Radek, Naperville, IL (US); Steve Zoloto, Highland Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 559 days.

This patent is subject to a terminal disclaimer.

(21) Appl. No.: 13/249,339

(22) Filed: Sep. 30, 2011

(65) Prior Publication Data

US 2012/0021821 A1 Jan. 26, 2012

Related U.S. Application Data

(63) Continuation of application No. 12/477,494, filed on Jun. 3, 2009, now Pat. No. 8,029,363.

(60) Provisional application No. 61/058,359, filed on Jun. 3, 2008.

(51) Int. Cl.
*A63F 13/12* (2006.01)
*G07F 17/32* (2006.01)

(52) U.S. Cl.
CPC .................................... *G07F 17/32* (2013.01)
USPC ........................................................... 463/35

(58) Field of Classification Search
CPC ... A63F 13/12; G07F 17/322; G07F 17/3216; G07F 17/3213; G07F 17/3202; G07F 17/32
USPC ........................................................... 463/35
See application file for complete search history.

(56) References Cited

U.S. PATENT DOCUMENTS

| | | | |
|---|---|---|---|
| 4,043,557 | A | 8/1977 | Johnston |
| 5,993,318 | A | 11/1999 | Kousaki |
| 6,154,549 | A | 11/2000 | Arnold |
| 6,669,346 | B2 | 12/2003 | Metcalf et al. |
| 6,716,106 | B2 | 4/2004 | Wang et al. |
| 7,027,600 | B1 | 4/2006 | Kaji et al. |
| 7,113,610 | B1 | 9/2006 | Chrysanthakopoulos |

(Continued)

FOREIGN PATENT DOCUMENTS

| | | |
|---|---|---|
| EP | 1760676 A2 | 3/2007 |
| EP | 1764756 A1 | 3/2007 |

(Continued)

OTHER PUBLICATIONS

"U.S. Appl. No. 12/477,494, Notice of Allowance mailed Jun. 1, 2011", 9 pgs.

(Continued)

*Primary Examiner* — Evan Pert
(74) *Attorney, Agent, or Firm* — Nixon Peabody LLP

(57) ABSTRACT

A computerized wagering game table system includes a wagering game module that is operable to present a wagering game upon which monetary value can be wagered, and an audio system. The audio system is operable to pan sounds associated with a wagering game object on multiple wagering game machines in a group of wagering game machines, wherein each of the multiple wagering game machines has one or more local speakers, and wherein the panning across multiple wagering game machines' local speakers is based on the game object's coordinate position on a community display.

17 Claims, 4 Drawing Sheets

(56) References Cited

U.S. PATENT DOCUMENTS

| | | | | |
|---|---|---|---|---|
| 7,367,886 | B2 | 5/2008 | Loose et al. | |
| 8,029,363 | B2 * | 10/2011 | Radek et al. | 463/35 |
| 8,172,677 | B2 * | 5/2012 | Bleich et al. | 463/30 |
| 2002/0098879 | A1 | 7/2002 | Rheey | |
| 2003/0100359 | A1 | 5/2003 | Loose et al. | |
| 2003/0214530 | A1 | 11/2003 | Wang et al. | |
| 2004/0110561 | A1 | 6/2004 | Kawamura | |
| 2004/0142739 | A1 | 7/2004 | Loose et al. | |
| 2005/0043090 | A1 | 2/2005 | Pryzby et al. | |
| 2005/0164787 | A1 | 7/2005 | Connelly | |
| 2005/0264527 | A1 | 12/2005 | Lin | |
| 2006/0009285 | A1 | 1/2006 | Pryzby et al. | |
| 2006/0068909 | A1 | 3/2006 | Pryzby et al. | |
| 2007/0060277 | A1 | 3/2007 | Okada et al. | |
| 2007/0060279 | A1 | 3/2007 | Okada et al. | |
| 2007/0060282 | A1 | 3/2007 | Okada et al. | |
| 2007/0060283 | A1 | 3/2007 | Okada | |
| 2007/0105621 | A1 | 5/2007 | Okada | |
| 2007/0105622 | A1 | 5/2007 | Okada | |
| 2008/0070685 | A1 | 3/2008 | Pryzby et al. | |
| 2009/0186696 | A1 | 7/2009 | Shai-Hee | |
| 2009/0201313 | A1 | 8/2009 | Thorn | |
| 2009/0298579 | A1 | 12/2009 | Radek et al. | |
| 2012/0021831 | A1 | 1/2012 | Shai-Hee | |

FOREIGN PATENT DOCUMENTS

| | | | |
|---|---|---|---|
| GB | 2430332 | A | 3/2007 |
| JP | 7-303159 | A | 11/1995 |
| JP | 8-292785 | A | 11/1996 |
| JP | 10-049178 | A | 2/1998 |
| JP | 11-009841 | A | 1/1999 |
| JP | 11-333091 | A | 12/1999 |
| JP | 2000-229176 | A | 8/2000 |
| JP | 2000-233074 | A | 8/2000 |
| JP | 2000-237449 | A | 9/2000 |
| JP | 2001-017693 | A | 1/2001 |
| JP | 2002-233979 | A | 8/2002 |
| JP | 2002-336544 | A | 11/2002 |
| JP | 2005-328890 | A | 12/2005 |
| KR | 20030032091 | | 4/2003 |
| KR | 20040107551 | | 12/2004 |
| TW | 548946 | B | 8/2003 |
| WO | WO-97/49262 | A1 | 12/1997 |
| WO | WO-2006/039323 | A1 | 4/2006 |
| WO | WO-2007/027396 | A2 | 3/2007 |

OTHER PUBLICATIONS

Schütze, S., "The creation of an audio environment as part of a computer game world: the design for Jurassic Park—Operation Genesis on the XBOT™ as a board concept for surround installation creation", *Organised Sound,* vol, 8, Issue 2, (2003), 171-180.

* cited by examiner

WAGERING GAME MACHINE WITH AREA SOUND PANNING

RELATED APPLICATION

This patent application is a continuation of U.S. patent application Ser. No. 12/477,494, filed Jun. 3, 2009, now U.S. Pat. No. 8,029,363 which claims the priority benefit of U.S. Provisional Application Ser. No. 61/058,359, filed Jun. 3, 2008 and entitled "WAGERING GAME MACHINE WITH AREA SOUND PANNING", the contents of which are incorporated herein by reference in their entireties.

FIELD OF THE INVENTION

The invention relates generally to wagering game audio, and more specifically in some embodiments to wagering game machines featuring area sound panning.

Limited Copyright Waiver

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games often do not rely on the dealer or other game players to facilitate game play and to provide an entertaining game playing environment, but rely upon the presentation of the game and environment generated by the wagering game machine itself. Incorporation of audio, video, and mechanical features into wagering game systems enhance the environment presented are therefore important elements in the attractiveness and commercial success of a computerized wagering game system. Further, a variety of network configurations and capabilities are becoming increasingly common, including local and wide area progressive games, downloadable games, and remotely managed wagering game systems.

Although traditional wagering game machines took the form of upright slot machines that were stand-alone devices that had no interaction with other wagering games, integration of computer and network technology has led to more complex games in which players interact, such as by taking part in progressive games or by playing group bonus games that feature actions taken by different game players at different wagering game machines. The challenges of interacting with players who are playing both individual wagering games and group games such as community bonus games face wagering game system designers and architects, and are important to providing an easy-to-follow and entertaining gaming experience.

SUMMARY

Various example embodiments of the invention comprise a computerized wagering game table system, including a wagering game module that is operable to present a wagering game upon which monetary value can be wagered, and an audio system. The audio system is operable to pan sounds associated with a wagering game object on multiple wagering game machines in a group of wagering game machines, wherein each of the multiple wagering game machines has one or more local speakers, and wherein the panning across multiple wagering game machines' local speakers is based on the game object's coordinate position on a community display. Various embodiments include local, global, or a combination of machine-specific panning.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some embodiments of the invention enhance presentation of game objects on a community display in a wagering game system environment by panning sounds associated with a wagering game object on multiple wagering game machines in a group of wagering game machines, wherein each of the multiple wagering game machines has one or more local speakers, and wherein the panning across multiple wagering game machines' local speakers is based on the game object's coordinate position on a community display. Various embodiments include local, global, or a combination of machine-specific panning.

Figure 1:
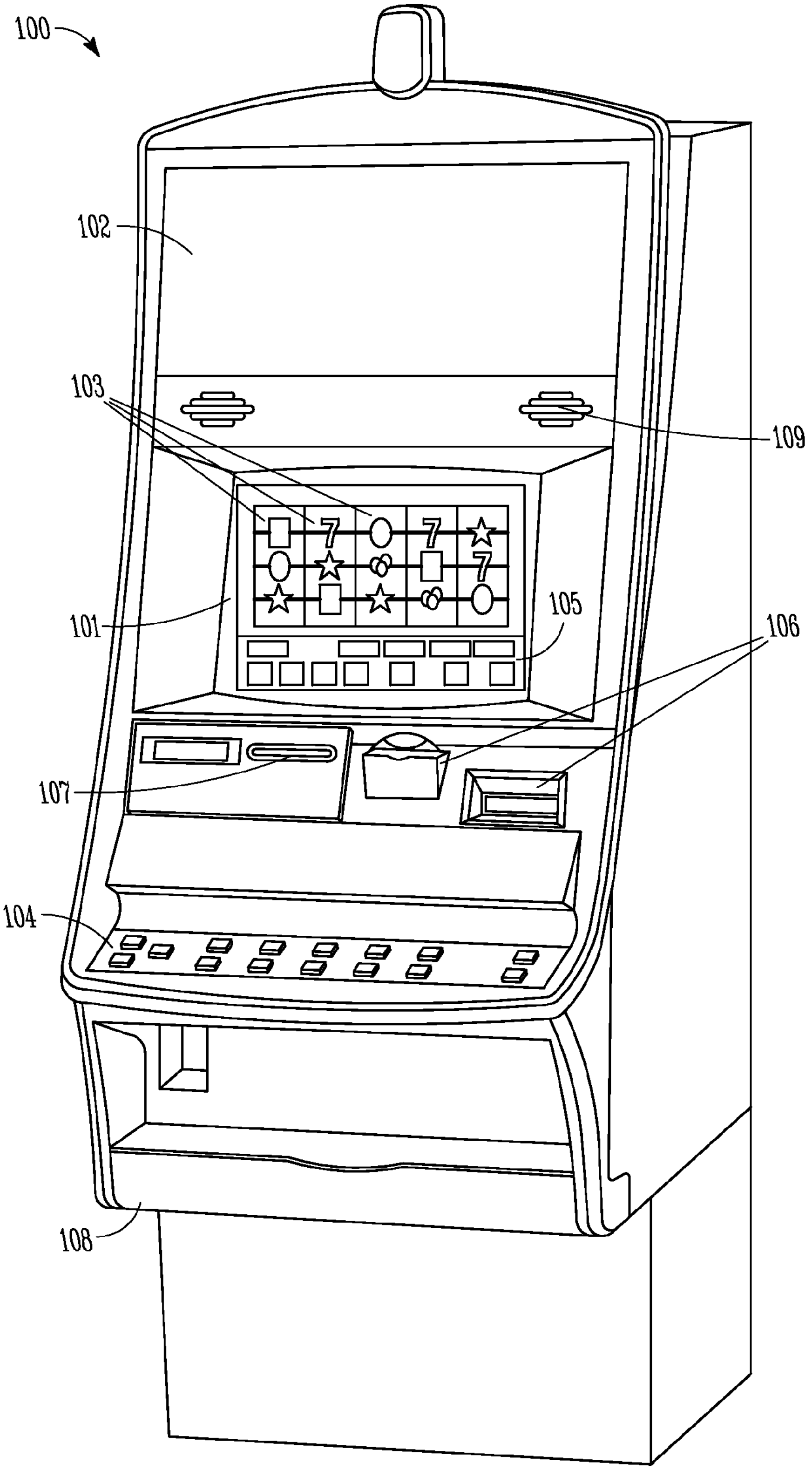
FIG. 1 shows a typical computerized wagering game machine, as may be used to practice some example embodiments of the invention.

FIG. 1 illustrates a typical single player computerized wagering game machine, as may be used in some embodiments of the present invention. The computerized gaming system shown generally at 100 is a video wagering game system, which displays information for at least one wagering game upon which monetary value can be wagered on video display 101. In a further example, a second video display 102 is provided as a part of a top-box assembly, such as to display a bonus game or other information. Video displays 101 and 102 are in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 103 that comprise a part of a video slot machine wagering game.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold'em games. The wagering game is played and controlled with inputs such as various buttons 104 or via touchscreen overlay buttons 105 on video screen 101. In some alternate examples, other devices such as pull arm are used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 106 or a secure user identification module interface 107, and winnings are returned via the returned value card or through the coin tray 108. Sound is also provided through speakers 109, typically including audio indicators of game play, such as reel spins, credit bang-ups, and environmental or other sound effects or music to provide entertainment consistent with a theme of the computerized wagering game.

In some further embodiments, the wagering game machine is coupled to a network, and is operable to use its network connection to receive wagering game data, track players and monetary value associated with a player, and to perform other such functions. In other embodiments, the wagering game system is a portable wagering game system, or has another format different from that illustrated in FIG. 1. In one such example, the wagering game system is a game table, having one or more display surfaces and one or more speakers to interact with multiple wagering game players positioned around the table.

Figure 2:
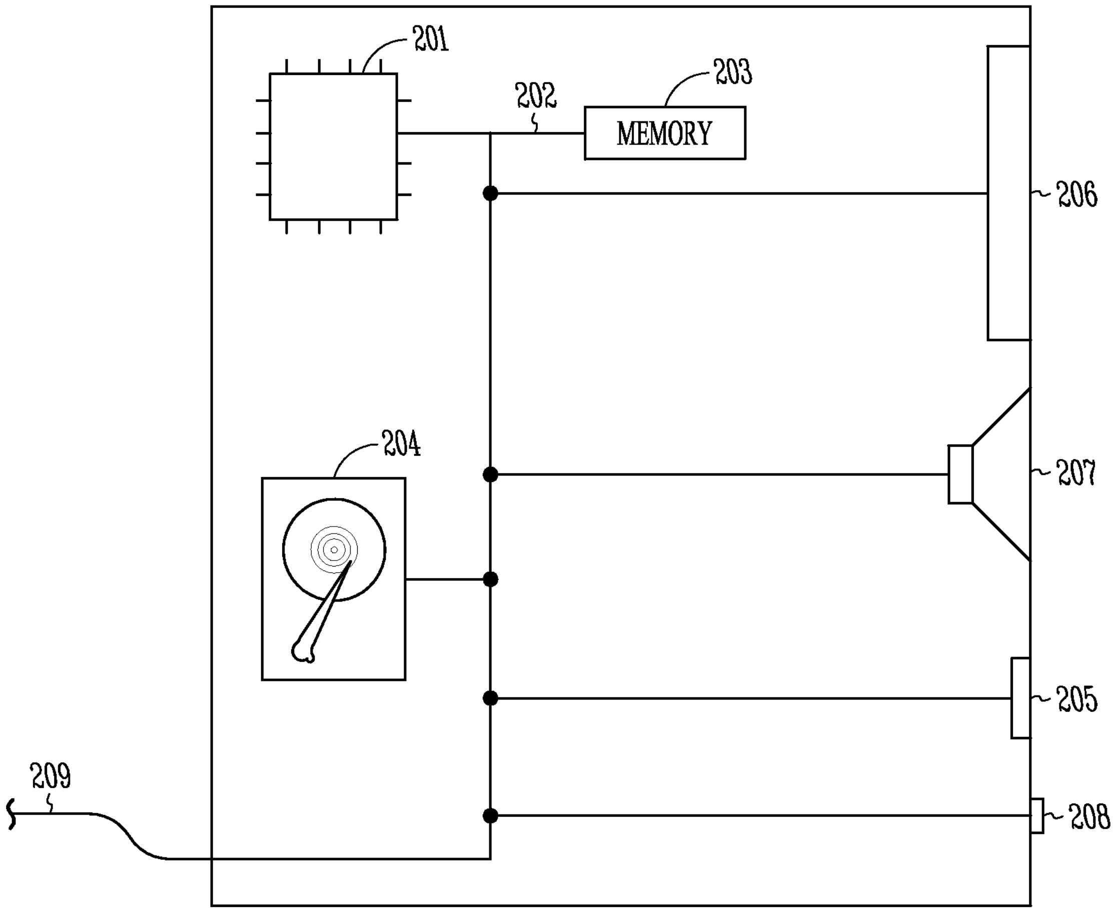
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or Blu-Ray storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game machine is coupled to other wagering game machines, and to various other elements such as game servers, accounting servers, or community or progressive game servers via the network connection 209, and exchanges data with these machines via the network connection.

Figure 3:
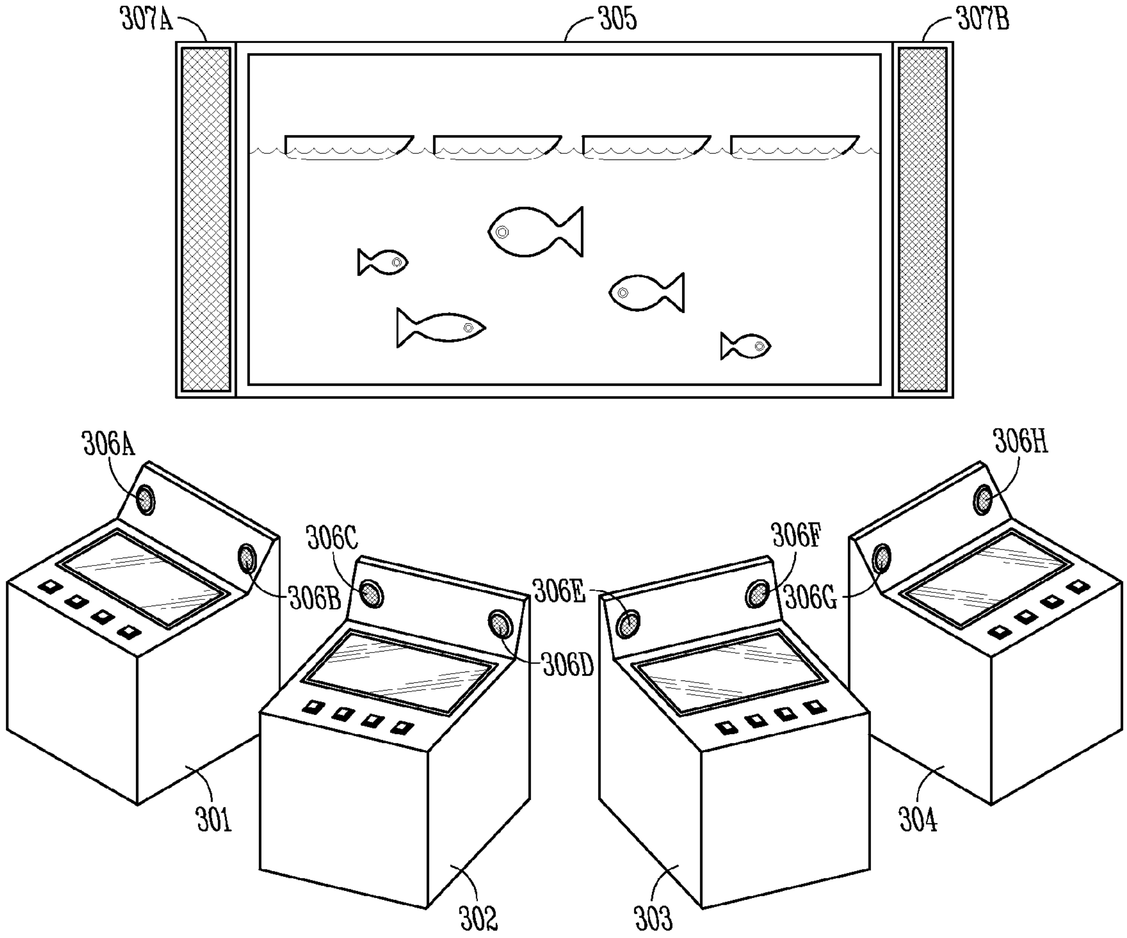
FIG. 3 shows a community wagering game system comprising a community display and four attached wagering game machines, consistent with an example embodiment of the invention.

FIG. 3 shows a community wagering game system comprising a community display and four attached wagering game machines, consistent with an example embodiment of the invention. Here, four wagering game machines numbered 301-304 are positioned in an arc around a community display 305, and form part of a community networked wagering game system. During normal game play, players are able to play individual wagering games at each of the wagering game machines 301-304. Game play is independent of game play at other wagering games, and there is no player interaction during normal game play.

A community bonus game is triggered from time to time, such as based on a clock, the amount of game play, a random event, or other factors, and the individual game players at wagering game machines 301-304 are now playing a community bonus game. In this example, each of the wagering game players eligible for the bonus game picks one of the four fisherman or fishing boats illustrated on the community game screen 305. The fisherman accumulate different bonus points or value associated with fish that they catch during the bonus game, and the points or value are awarded to the players based on their selected fishing boat and the boat's accumulated fish at the end of the bonus game. The bonus game is therefore a cooperative game in which players may interact, such as by participating in the same fishing contest or choosing the same fishing boat as another player, but is competitive in the sense that players are independently accumulating bonus points during the bonus game. Fish caught by one player's boat are also not available to be caught by another's boat, enhancing the sense of player interaction and competition in this example.

Each of the wagering game systems 301-304 has speakers 306 located in the individual wagering game cabinet, that are used during regular game play to provide sound to the game player. Sounds include music, sound effects, instructions, sounds associated with game elements, and other sounds that may be used to enhance the game playing experience. Because each individual game player at a wagering game machine 301-304 is playing a wagering game that is independent of the games being played on other machines, the sounds played at each wagering game are unique to the game being played on each machine.

When the bonus game starts in this example, the players at the individual game machines begin to participate in a common community game. Now, the sound presented to the game players is not necessarily unique to each game player's game, but includes community bonus game sounds common to all players. For example, if a boat at the far left side of the screen 305 fires up a boat motor and moves to the far right side of the screen, sound effects played at a single individual wagering game machine may not convey the sense of movement of the boat as well as being able to provide sound that pans from the left side of the group of wagering game machines to the right side of the wagering game machines. In another example, sound panning representing movement of the boat from left to right presented on wagering game machine 301 may need to be different than the panning presented on wagering game machine 304 to provide realistic sound effects properly coordinated with the apparent location of the moving boat.

For example, if a boat on the far left of the screen starts up its boat motor, the sound as presented to the wagering game player at wagering game machine 301 may be centered or balanced between two speakers 306A and 306B on the wagering game machine, as the boat appears to be nearly in front of a player at that wagering game machine rather than far off to the left. A game player hearing the same sound effect presented through wagering game system 304 will desirably hear the sound panned significantly to the left speaker 306G as opposed to right speaker 306H, as the boat on the far left side of community gaming screen 305 appears to be far to the left of the game player's position. This difference in apparent panning or sound position for different game players is termed local mapping for purposes of this example, as sound effect panning relating to community game objects is mapped differently to various local wagering game machines depending on the location of each wagering game machine relative to the community game display 305 and the displayed game object.

In another example, global panning is used to provide panning of a sound across multiple game machines, such as by panning a sound not only from speaker to speaker but also from game machine to game machine as a boat travels from the far left of the screen to the far right. In a global panning example, the boat at the far left starts its motor, and accompanying sounds are played through the speakers 306A and 306B at wagering game machine 301, which is physically nearest the displayed boat graphic image. As the game object moves from left to right, the associated motorboat sound moves from left to right as well, panning across the speakers 306C-306F of wagering game machines 302 and 303 as the boat moves further to the right. When the boat reaches the right side of the screen, the boat motor sounds will be panned to be loudest at the speakers 306G and 306H of wagering game machine 304, which will then be physically nearest the displayed image of the fishing boat game object.

In the global panning example, it is desirable that the physical location of the wagering game systems is known so that the globally panned sound can be provided through the speakers physically closest to the displayed image of the associated game object. This can be configured in various embodiments by placing the wagering game machines in a pre-determined location relative to the community game display, by providing a game technician a map or other tool to configure the location of various game machines relative to the community game display, or by other suitable means. A community game controller provides sounds having specific volumes or panning information determined by the community game controller to the game machines in some embodiments, while in other embodiments the individual wagering game machines use their own audio features to apply appropriate panning or other sound effects to the played audio.

In various further embodiments, elements of local panning and global panning in a community wagering game environment are combined or altered. In one such example, the fishing boat is displayed moving from right to left while sounds such as a boat motor are panned from right to left on individual wagering game machines in coordination with the movement of the boat, but the overall sound level played on a wagering game machine becomes significantly louder as the displayed boat nears the physical location of the wagering game machine. This change in apparent overall volume of the sound being panned results in a global panning effect, which complements the local panning effect both to the individual game player as well as to other game players or to spectators watching the community game.

In the community bonus game example presented above, the community game system is further operable in some embodiments to play certain sounds applicable only to certain community game players either only to those applicable game players, or at a higher volume to the applicable game players. For example, if two of the four community game players using the system of FIG. 3 have picked a specific boat, sounds related to that boat's actions, such as fishing rods casting line, water splashing, fish chomping sounds, etc., may be played only to those players who have selected the specific boat associated with those sounds. In an alternate embodiment, the sounds may be played at each of the wagering game machines 301-304, but will be played at a louder volume level or using other distinguishing audio effects to those game players who have selected the associated boat.

Other sound spatial effects are used in some embodiments of the game, including use of echo, frequency response shaping, phase alteration, and other such audio effects to change the way that played sounds are perceived. For example, echo and frequency response can be changed to alter audio so that it sounds as though it is coming from a distance over water. Other effects can change the apparent position or environment of sounds in other ways that will complement various wagering game themes and presentations.

Sound panning is determined in one example embodiment by assigning a coordinate position to one or more relevant game objects that have associated sounds that are to be panned with a change in game object position, such as by assigning an x-coordinate to the boat location on the community game screen 305. The coordinate position of the boat is used by the audio module to determine where the graphical representation of the boat will be physically located on the community game screen, so that appropriate sound panning can be applied to boat sounds associated with that boat.

In a further example, the community display also has one or more speakers, such as left speaker 307A and right speaker 307B. These speakers are used in some embodiments to provide or enhance a global panning effect, such as by panning between speakers 307A and 307B to provide global panning while local wagering game machines provide local panning effects, or to provide global panning in conjunction with a global panning effect presented through speakers 306A-H of the individual wagering game machines. Use of display speakers such as 307A-B provides a global panning effect to viewers not in the immediate vicinity of wagering game machines in some such embodiments, such as to spectators who are not actively playing the wagering game.

The speakers 307 are in another example multiple speakers arranged around the perimeter of the community display 305, such as individually addressable speakers positioned up and down both sides of the display as shown in FIG. 3, or further including speakers along the top and bottom of the community display. This enables the community display to more effectively pan sounds related to game objects displayed on the community display in multiple dimensions, such as up and down, and from side to side. Other effects such as frequency response tailoring and volume attenuation are used in a further example to add a sense of distance to sounds associated with game objects that are displayed in a three-dimensional space, such as fish that are further away from the foreground dimension in the example of FIG. 3.

Figure 4:
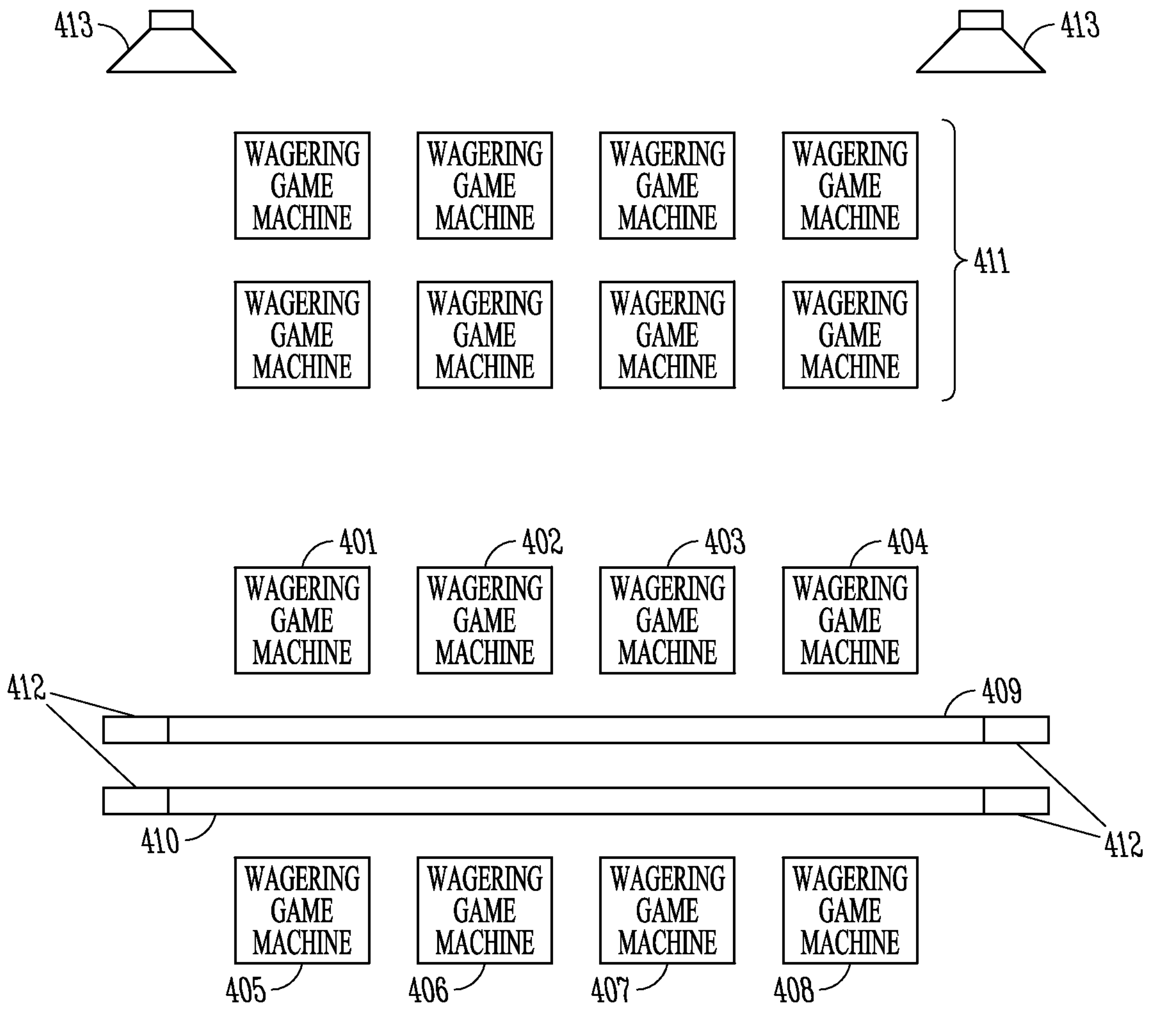
FIG. 4 shows an alternate physical layout of a group of wagering games that are part of a community bonus game wagering game system, consistent with an example embodiment of the invention.

FIG. 4 shows an alternate physical layout of a group of wagering games that are part of a community bonus game wagering game system, consistent with an example embodiment of the invention. A first row of wagering game machines 401-404 face a community display 409, while a second row of wagering game machines 405-408 faces a community display 410. In this example, community displays 409 and 410 show exactly the same community game image and game elements, so that all players who are members of the community bonus game see the same bonus game information. Wagering games 401-404 and community display 409 operate using local, global, or other panning or audio effects as described above, while wagering game machines 404-408 and community game display 410 function in the same way but with panning only between game machines 405-408 in conjunction with display 410. Although the physical layout of game machines 401-404 and display 409 is symmetric with wagering game machines 405-408 and display 410 in this example such that some similar panning effects may be used for wagering game groups 401-404 and 405-408, the physical layout and panning effects will vary in other examples.

In a further embodiment, other wagering game machines such as the group of game machines shown at 411 are a part of the bonus game event, and will include local or global panning, or various combinations of panning and other sound effects. Supplemental speakers, such as speakers mounted near the community game display 409, mounted near a group of wagering game machines such as 411, or mounted elsewhere are used in a further embodiment to provide or enhance various panning or other sound effects.

The speakers 412 associated with community display 409 and the peripheral speakers 413 are used in another example embodiment to provide audio panning in a third, or "z" dimension, such that panning occurs not only between the sides of display 409 in conjunction with a displayed game object, but occurs at various depths or positions between the display 409's speakers 412 and the peripheral speakers 413. The depth of three-dimensional panning can further be extended past the area bounded by the speakers 412 and 413, such as into or past the display 409, by altering audio characteristics such as high frequency attenuation, reduction in volume, pitch or Doppler frequency, and other such acoustic characteristics.

The speakers associated with the various wagering game machines 401-404 and 411 can also be used to provide a three-dimensional panning effect, moving a sound within the area bounded by the speakers by changing volume of sounds presented at various wagering game systems based on their physical location in a wagering game establishment, and by using audio effect such as the frequency, volume, and other effects described above.

The examples presented here have shown how some embodiments of the invention use machine-specific global and local panning of audio to enhance the presentation of wagering game objects on a community display. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

For example, one embodiment includes a computerized wagering game system comprising: a wagering game module operable to present a wagering game upon which monetary value can be wagered; and an audio module operable to pan sounds associated with a wagering game object on multiple wagering game machines in a group of wagering game machines, wherein each of the multiple wagering game machines has one or more local speakers, and wherein the panning across multiple wagering game machines' local speakers is based on a coordinate position of the game object on a community display. In a further embodiment, the panning comprises local panning between two or more local speakers in each of two or more wagering game machines, such that the panned sound position on each wagering game machine is dependent on the apparent position of the wagering game object on the community display relative to each specific wagering game machine's physical location. In another further embodiment, the panning comprises panning globally across speakers associated with two or more wagering game machines having known physical locations, such that only the wagering game machines in nearest relative position to the wagering game object's coordinates on the community display present sounds associated with the wagering game object. In another further embodiment, the group of wagering game machines comprises a community game group of gaming machines that are operable to facilitate individual game player participation in one or more community games. In another further embodiment, the panning comprises using a subset of wagering game machines near each player to present player-specific panned sounds. In another further embodiment, the audio module is further operable to use spatial audio cues to present sounds associated with the displayed wagering game object such that the spatial audio cues provide sound location information associated with the coordinate position of the wagering game object on the community display. In another further embodiment, the group of wagering game systems are operable to provide both local and global panning that are machine-specific, and the local panning may comprise amplified sounds associated with a wagering game object specific to a local wagering game player.

As another example, one embodiment includes a method of operating a wagering game system, comprising: presenting a wagering game upon which monetary value can be wagered; and panning sounds associated with a wagering game object on multiple wagering game machines in a group of wagering game machines, wherein each of the multiple wagering game machines has one or more local speakers, and wherein the panning across multiple wagering game machines' local speakers is based on a coordinate position of the game object on a community display. In a further embodiment, the panning comprises local panning between two or more local speakers in each of two or more wagering game machines, such that the panned sound position on each wagering game machine is dependent on the apparent position of the wagering game object on the community display relative to each specific wagering game machine's physical location. In another further embodiment, the panning comprises panning globally across speakers associated with two or more wagering game machines having known physical locations, such that only the wagering game machines in nearest relative position to the wagering game object's coordinates on the community display present sounds associated with the wagering game object. In another further embodiment, the method includes using spatial audio cues to present sounds associated with the displayed wagering game object such that the spatial audio cues provide sound location information associated with the coordinate position of the wagering game object on the community display. In another further embodiment, the group of wagering game systems are operable to provide both local and global panning that are machine-specific, and the local panning may comprise amplified sounds associated with a wagering game object specific to a local wagering game player.

As another example, one embodiment includes a machine-readable medium with instructions stored thereon, the instructions when executed operable to cause a computerized wagering game system to: present a wagering game upon which monetary value can be wagered; and pan sounds associated with a wagering game object on multiple wagering game machines in a group of wagering game machines, wherein each of the multiple wagering game machines has one or more local speakers, and wherein the panning across multiple wagering game machines' local speakers is based on a coordinate position of the game object on a community display. In a further embodiment, the panning comprises local panning between two or more local speakers in each of two or more wagering game machines, such that the panned sound position on each wagering game machine is dependent on the apparent position of the wagering game object on the community display relative to each specific wagering game machine's physical location. In another further embodiment, the panning comprises panning globally across speakers associated with two or more wagering game machines having known physical locations, such that only the wagering game machines in nearest relative position to the wagering game object's coordinates on the community display present sounds associated with the wagering game object. In another further embodiment, the instructions when executed further operable to cause the computerized wagering game system to use spatial audio cues to present sounds associated with the displayed wagering game object such that the spatial audio cues provide sound location information associated with the coordinate position of the wagering game object on the community display. In another further embodiment, the group of wagering game systems are operable to provide both local and global panning that are machine-specific, and the local panning may comprise amplified sounds associated with a wagering game object specific to a local wagering game player.

As another example, one embodiment includes a wagering game system, comprising: means for presenting a wagering game upon which monetary value can be wagered; and means for panning sounds associated with a wagering game object on multiple wagering game machines in a group of wagering game machines, wherein each of the multiple wagering game machines has one or more local speakers, and wherein the panning across multiple wagering game machines' local speakers is based on the game object's coordinate position on a community display.

The invention claimed is:

1. A networked gaming system, comprising:

a community display for presenting a community game having a community game element;

a plurality of wagering game machines in communication with the community display, each of the wagering game machines including one or more local speakers;

at least one processor;

at least one memory device having a plurality of instructions stored therein, that when executed by the processor, cause the processor to perform operations comprising:

providing community game sounds for the community game, and panning the community game sounds across the local speakers of multiple of the wagering game machines based on a movement of the community game element on the community display.

2. The networked gaming system of claim 1, wherein panning the community game sounds across the local speakers includes panning a sound based on a location of each of the wagering game machines relative to the community display.

3. The networked gaming system of claim 1, wherein the community game includes a second community game element and a second set of community game sounds, and wherein the second set of community game sounds is reproduced at the local speakers of at least one of the wagering gaming machines.

4. The networked gaming system of claim 1, wherein each of the wagering game machines includes a respective local display, the local display separate from the community display.

5. The networked gaming system of claim 1, further comprising a controller, wherein at least one of the processors and at least one of the memory devices are located within the controller which provides the community game sounds for the community game, and which pans the community game sounds across the local speakers, and wherein the panning of the community game sounds comprises providing a plurality of sounds having specific volumes to each of the wagering game machines.

6. The networked gaming system of claim 5, further comprising:

a plurality of community speakers; and wherein the controller is configured to further pan sounds among the plurality of community speakers.

7. The networked gaming system of claim 1, wherein the community game is initiated as a result of game play occurring on the wagering game machines.

8. The networked gaming system of claim 1, wherein the operations further comprise applying one or more sound effects to the community game sounds.

9. A gaming system having one or more wagering gaming machines, comprising:

a community display providing a community game viewable by players of the wagering game machines;

one or more community speakers proximate the community display;

one or more local speakers proximate to each of the wagering game machines; and a controller configured to coordinate playback of panned sounds by the local speakers in connection with the community game, wherein panning of the sounds is in reference to locations of game objects rendered on the community display during the community game.

10. The gaming system of claim 9, wherein the community speakers include a left speaker and a right speaker, and wherein panning of the sounds includes panning of the sounds between the left speaker and the right speaker.

11. The gaming system of claim 9, further comprising: one or more peripheral speakers remote to the community display.

12. The gaming system of claim 11, wherein the peripheral speakers are located at a third dimension relative to the community speakers and the local speakers, and wherein the controller is further configured to use the peripheral speakers to provide audio panning in a third dimension at various depths among the wagering game machines.

13. A computer-implemented method in a gaming system, comprising:

presenting a community game displayed on a community display device, the community game including at least one moving image displayed on the community display device;

receiving interactions with the community game input through a plurality of wagering game machines; and playing sounds having localized sound effects on selected speakers in a set of local speakers located proximate the wagering game machines, the sound effects played on the local speakers in connection with movement of an image on the community display device relative to locations of the local speakers.

14. The computer-implemented method of claim 13, wherein each local speaker is associated with a respective wagering game machine, and wherein the playing of sounds having localized sound effects includes changing the volume of the sounds based upon both the position of the image on the community display device and a position of the wagering game machine relative to the community display.

15. The computer-implemented method of claim 13, wherein the playing of sounds having localized sound effects results in multiple volume levels of the sounds across sets of local speakers in the gaming system.

16. The computer-implemented method of claim 13, wherein the community game provides simultaneous gaming interaction for a plurality of users at the plurality of wagering game machines.

17. A controller configured for use in a networked gaming system having a plurality of wagering game machines and a plurality of local speakers associated with the wagering game machines, comprising:

at least one processor; and one or more machine-readable storage media including instructions that, when executed by one or more processors, cause the one or more processors to perform operations comprising:

controlling the playing of sounds associated with a community game by the plurality of local speakers, wherein at least one sound is panned across the local speakers, based on movement of a game element within the community game.

* * * * *